(12) United States Patent
Takaki

(10) Patent No.: US 11,288,961 B2
(45) Date of Patent: Mar. 29, 2022

(54) VEHICLE CONTROL APPARATUS AND VEHICLE CONTROL METHOD

(71) Applicant: DENSO CORPORATION, Kariya (JP)

(72) Inventor: Ryo Takaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 708 days.

(21) Appl. No.: 16/095,111

(22) PCT Filed: Apr. 19, 2017

(86) PCT No.: PCT/JP2017/015779
§ 371 (c)(1),
(2) Date: Oct. 19, 2018

(87) PCT Pub. No.: WO2017/183668
PCT Pub. Date: Oct. 26, 2017

(65) Prior Publication Data
US 2019/0122555 A1    Apr. 25, 2019

(30) Foreign Application Priority Data

Apr. 22, 2016 (JP) .............................. JP2016-086409

(51) Int. Cl.
| G08G 1/16 | (2006.01) |
| B60T 7/12 | (2006.01) |
| B60R 21/00 | (2006.01) |
| B60W 30/08 | (2012.01) |
| B60K 31/00 | (2006.01) |
| G06K 9/00 | (2006.01) |

(52) U.S. Cl.
CPC ............... *G08G 1/16* (2013.01); *B60K 31/00* (2013.01); *B60R 21/00* (2013.01); *B60T 7/12* (2013.01); *B60W 30/08* (2013.01); *G06K 9/00805* (2013.01); *G08G 1/166* (2013.01)

(58) Field of Classification Search
CPC ................................. B60T 7/12; B60R 21/00
See application file for complete search history.

(56) References Cited

U.S. PATENT DOCUMENTS

| 8,897,497 B2 * | 11/2014 | Shiraishi | G01S 17/931 382/104 |
| 2015/0175072 A1 * | 6/2015 | Sabeti | G08G 1/166 348/148 |
| 2016/0082955 A1 * | 3/2016 | Nguyen Van | B60W 10/18 701/41 |

FOREIGN PATENT DOCUMENTS

| JP | 2008-310585 A | 12/2008 |
| JP | 2010-152839 | 7/2010 |
| JP | 2014-106901 A | 6/2014 |

(Continued)

*Primary Examiner* — Lail A Kleinman
(74) *Attorney, Agent, or Firm* — Maschoff Brennan

(57) ABSTRACT

A driving assist ECU acquires, based on an image, positions of at least two specific points of an object that are different in a lateral direction with respect to a vehicle traveling direction. The driving assist ECU also performs collision avoidance control for avoiding a collision with the object based on a movement track of the object obtained from a history of the positions of the specific points, and calculates, for each of the specific points, a movement direction of each of the specific points based on the history of the position of each of the specific points. The driving assist ECU then changes how to perform the collision avoidance control based on a difference between the movement directions at the respective specific points.

10 Claims, 7 Drawing Sheets

(56) References Cited

FOREIGN PATENT DOCUMENTS

| JP | 2015-132553 | 7/2015 |
| WO | WO 2013/088516 A1 | 6/2013 |

\* cited by examiner (a)

(b)

(a)

(b)

(a)

(b)

(a)

(b)

(a)

(b)

(c)

(d)

(a)

(b)

VEHICLE CONTROL APPARATUS AND VEHICLE CONTROL METHOD

CROSS-REFERENCE TO RELATED APPLICATION

The present application is a national stage application under 35 U.S.C. § 371(c) of PCT Application No. PCT/JP2017/015779, filed on Apr. 17, 2017, which is based on Japanese Patent Application No. 2016-086409 filed on Apr. 22, 2016, the description of which is incorporated herein by reference.

TECHNICAL FIELD

The present disclosure relates to a vehicle control apparatus and a vehicle control method for detecting an object present ahead of a vehicle.

BACKGROUND ART

Conventionally, various types of control are proposed for detecting objects present around an own vehicle such as other vehicles and pedestrians by an imaging section and for improving traveling safety of the vehicle on the basis of the result of detecting the objects. For example, a vehicle control apparatus that actuates a brake unit and notifies the driver is proposed. Such a vehicle control apparatus calculates a movement track of a detected object on the basis of the position of the object, and performs various types of control for avoiding a collision between the own vehicle and the object on the basis of the calculated movement track.

PTL 1 discloses a method of detecting left and right ends of an object on the basis of an image captured by a stereo camera. The apparatus described in PTL 1 identifies parts of the image with significant differences in color density as an edge of the object, and detects the left and right ends of the object on the basis of the identification result.

CITATION LIST

Patent Literature

[PTL 1] JP 2008-310585 A

SUMMARY OF THE INVENTION

In a case where the position of a specific point of an object is detected from an image captured by an imaging section, an error may occur in the acquired position of the specific point due to the shape and pattern of the outer surface of the object, its attachments, and the like. The error in the position of the specific point causes a change in the movement track calculated on the basis of the position, and the change may result in unnecessary operation in various types of control for improving traveling safety of the vehicle.

The present disclosure has been made in view of the above problems, and an object thereof is to provide a vehicle control apparatus and a vehicle control method capable of preventing unnecessary operation while performing various types of control for improving traveling safety of a vehicle.

The present disclosure provides a vehicle control apparatus that detects an object present ahead of a vehicle in a vehicle traveling direction based on an image acquired by an imaging section, the vehicle control apparatus including: a position acquisition section that acquires, based on the image, positions of at least two specific points of the vehicle that are different in a lateral direction with respect to the vehicle traveling direction; a control section that performs collision avoidance control against the object based on a movement track of the object obtained from a history of the positions of the specific points; a calculation section that calculates, for each of the specific points, a movement direction of each of the specific points based on the history of the position of each of the specific points; and a changing section that changes how to perform the collision avoidance control based on a difference between the movement directions at the respective specific points.

Since the specific points of the object do not change, the movement directions of the respective specific points should be the same in accordance with the movement direction of the object. Therefore, if there is a difference between the movement directions of the respective specific points, the probability that the acquired specific points are improper is high. If the acquired specific points are improper, collision avoidance control against the object is not properly performed, and unnecessary operation is liable to occur frequently. In order to prevent such a situation, how to perform collision avoidance control is changed based on the difference between the movement directions at the respective specific points. With the above configuration, unnecessary operation of the own vehicle due to an error in the specific points acquired based on the image can be prevented.

BRIEF DESCRIPTION OF DRAWINGS

The above and other objects, characteristics, and advantages of the present disclosure will be further clarified in the following detailed description with reference to the accompanying drawings, in which.

DESCRIPTION OF EMBODIMENTS

Figure 1:
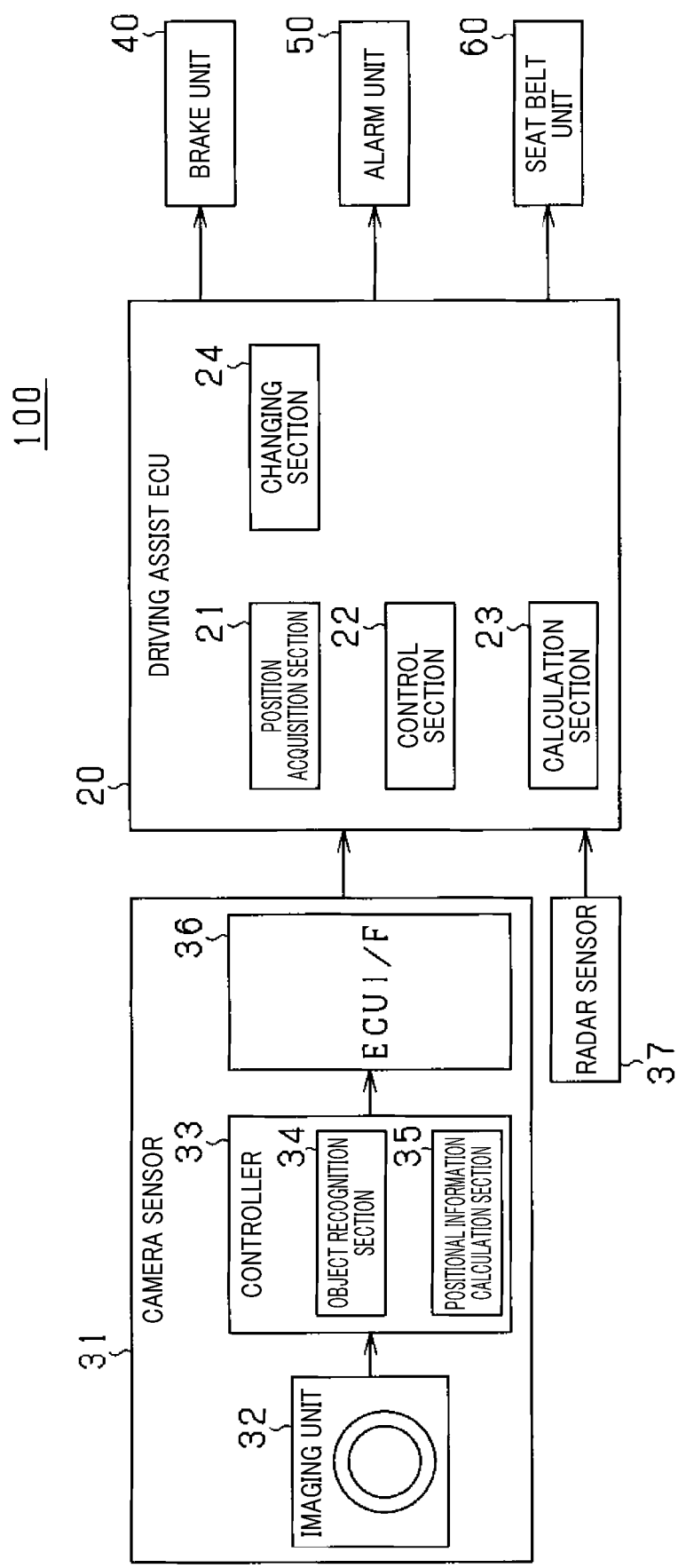
FIG. 1 is a configuration diagram of a PCSS.

Hereinafter, embodiments of a vehicle control apparatus and a vehicle control method according to the present disclosure will be described with reference to the drawings. In the following embodiments, components that are identical or equivalent to each other are denoted by the same reference sign in the drawings, and the description of a component is incorporated by reference in the description of another component denoted by the same reference sign.

First Embodiment

FIG. 1 illustrates a pre-crash safety system (hereinafter referred to as a PCSS) 100 to which a vehicle control apparatus and a vehicle control method are applied. The PCSS 100 is an example of a vehicle system installed in a vehicle, for example, and detects an object located ahead. In the event that the vehicle is in danger of colliding with the detected object, the PCSS 100 avoids or mitigates the collision between the vehicle and the object. Hereinafter, a vehicle equipped with the PCSS 100 is referred to as an own vehicle CS, and an object to be detected is referred to as a target Ob.

As illustrated in FIG. 1, the PCSS 100 includes various sensors, a driving assist ECU 20, a brake unit 40, an alarm unit 50, and a seat belt unit 60. In the embodiment illustrated in FIG. 1, the driving assist ECU 20 functions as a vehicle control apparatus.

Various sensors are connected to the driving assist ECU 20 to output the result of detecting the target Ob to the driving assist ECU 20. In FIG. 1, various sensors are a camera sensor 31 and a radar sensor 37.

The camera sensor 31 is configured by using, for example, a CCD camera, a CMOS image sensor, a near-infrared camera, or the like. The camera sensor 31 is arranged on the front side of the own vehicle CS to detect the target Ob located ahead of the own vehicle. The camera sensor 31 includes an imaging unit 32, a controller 33, and an ECU I/F 36. The imaging unit 32 acquires images of an area in front of the vehicle. The controller 33 performs well-known image processes on a captured image acquired by the imaging unit 32. The ECU I/F 36 enables the controller 33 and the driving assist ECU 20 to communicate with each other. Thus, the imaging unit 32 functions as an imaging section.

The imaging unit 32 includes a lens section that functions as an optical system and an imaging element that converts light collected through the lens section into an electric signal. The imaging element may be a well-known imaging element such as a CCD and a CMOS. An electrical signal obtained through conversion by the imaging element is stored in the controller 33 as a captured image.

The controller 33 is configured by a well-known computer including a CPU, a ROM, a RAM, and the like. The controller 33 also functionally includes an object recognition section 34 and a positional information calculation section 35. The object recognition section 34 recognizes the target Ob included in a captured image. The positional information calculation section 35 calculates positional information of a recognized object. The object recognition section 34 recognizes the target Ob in a captured image using a dictionary. The positional information calculation section 35 calculates the position of the recognized target Ob relative to the own vehicle CS.

Specifically, the object recognition section 34 acquires image data from the imaging unit 32, and determines the type of the target Ob present ahead of the own vehicle on the basis of the image data and dictionary information prepared for object identification in advance. The dictionary information for object identification is individually prepared for each type of object such as automobiles, two-wheel vehicles, and pedestrians, for example, and is stored in advance in a memory. The dictionary information for automobiles preferably includes at least front patterns and rear patterns. The object recognition section 34 compares image data with the dictionary information and performs pattern matching to determine the type of the target Ob.

Figure 2:
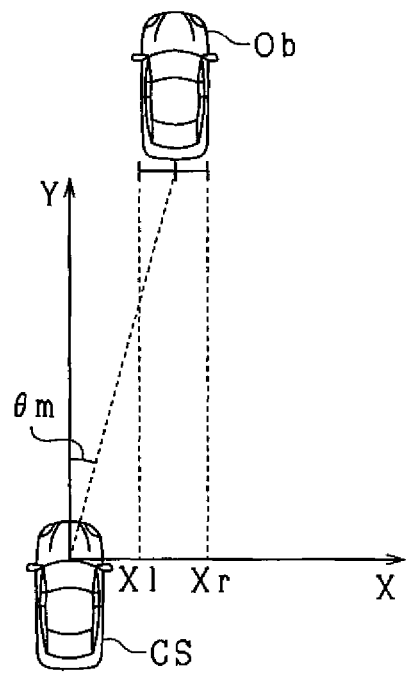
FIG. 2 is a diagram for describing positional information including lateral positions.

As illustrated in FIG. 2, the positional information calculation section 35 acquires positional information including the positions of the left and right ends of the target Ob in the lateral direction (X-axis direction) with respect to the vehicle traveling direction (Y-axis direction), with the imaging direction of the camera sensor 31 oriented in the vehicle traveling direction. The positional information includes lateral positions (Xr, Xl) indicating the left and right end points of the target Ob in the lateral direction and an azimuth θm indicating the bearing from the own vehicle CS to the target Ob. For example, the positional information calculation section 35 calculates, as the azimuth θm, an angle from the position of the own vehicle CS with reference to the vehicle traveling direction (Y-axis direction) to a center point between the lateral positions (Xr, Xl).

The radar sensor 37 detects a position of the target Ob located ahead of the own vehicle by utilizing directional electromagnetic waves such as millimeter waves. The radar sensor 37 is attached to the front part of the vehicle such that the optical axis thereof is oriented in the vehicle forward direction. The radar sensor 37 scans a region extending over a certain range in the vehicle forward direction with transmission waves at certain intervals, and receives reflected waves reflected by a surface of a front object to acquire a distance to and a speed relative to the target Ob as object information. The acquired object information is input to the driving assist ECU 20. Instead of the radar sensor 37, electromagnetic waves such as infrared rays and laser light may be utilized to detect a position of the target Ob.

The brake unit 40 includes a brake mechanism that changes braking force of the own vehicle CS and a brake ECU that controls operation of the brake mechanism. The brake ECU is connected to the driving assist ECU 20 in a communicable manner, and controls the brake mechanism under the control of the driving assist ECU 20. The brake mechanism includes, for example, a master cylinder, a wheel cylinder that applies braking force to wheels, and an ABS actuator that adjusts distribution of pressure (hydraulic pressure) from the master cylinder to the wheel cylinder. The ABS actuator is connected to the brake ECU, and adjusts hydraulic pressure from the master cylinder to the wheel cylinder under the control of the brake ECU to adjust the degree of actuation of the wheels.

The alarm unit 50 notifies the driver of presence of the target Ob in front of the vehicle under the control of the driving assist ECU 20. The alarm unit 50 includes, for example, an interior speaker and a display unit that displays images.

The seat belt unit 60 is a pretensioner that pulls a seat belt provided on each seat of the own vehicle. The seat belt unit 60 performs preliminary operation for pulling seat belts in the event of an increase in a probability of a collision between the own vehicle CS and the target Ob. In the event that a collision cannot be avoided, the seat belt unit 60 pulls seat belts to remove slack, so that occupants such as the driver are strapped in their seats for occupant protection.

The driving assist ECU 20 is configured as a well-known microcomputer including a CPU, a ROM, and a RAM, and refers to computation programs and control data in the ROM to control the own vehicle CS. The driving assist ECU 20 also senses the target Ob on the basis of a detection result provided by the camera sensor 31, and performs PCS by controlling at least one of the units 40, 50, and 60.

The driving assist ECU 20 executes a program stored in the ROM to function as a position acquisition section 21, a control section 22, a calculation section 23, and a changing section 24.

First, PCS (collision avoidance control) performed by the driving assist ECU 20 will be described. The position acquisition section 21 acquires positional information of the target Ob on the basis of the result of detecting an object by the camera sensor 31. The positional information is recorded in history information.

Figure 3:
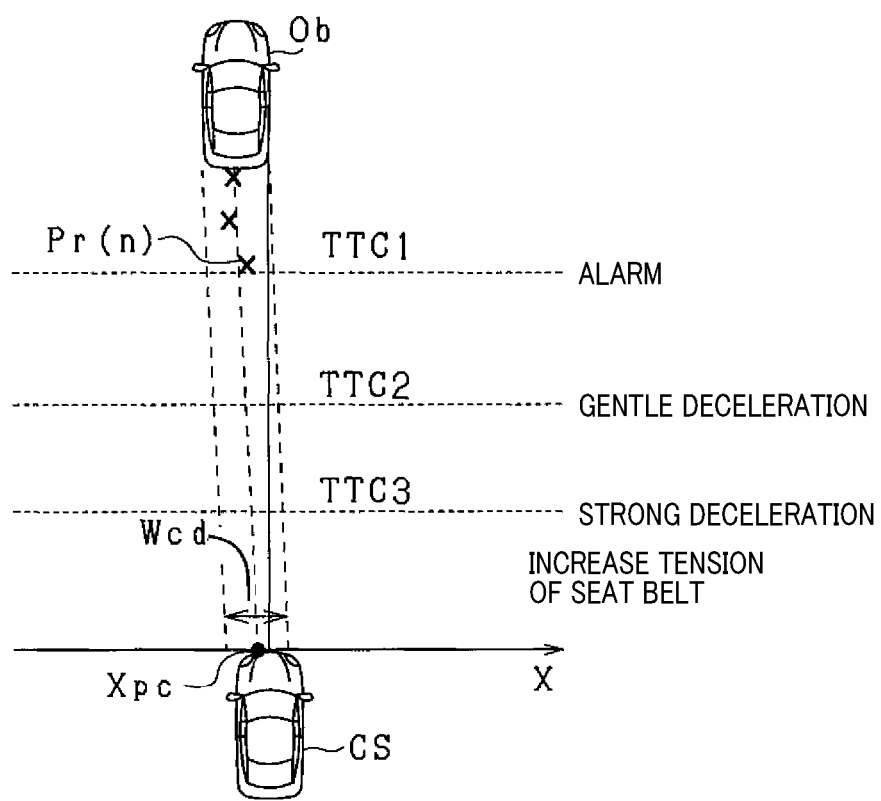
FIG. 3 is a diagram for describing PCS.

The control section 22 performs PCS against the target Ob on the basis of a movement track of the target Ob obtained from a positional information history. For example, the control section 22 calculates, as the position Pr of the target Ob, the middle point between the right end point Xr and the left end point Xl acquired as lateral positions, and connects the positions Pr in order of time to calculate a movement track. FIG. 3 illustrates the positions Pr of a preceding vehicle detected as the target Ob at different time points and the movement track calculated from the positions Pr. Position Pr (n) at time point n is the latest position of the target Ob recorded in the history information. For example, the control section 22 calculates, as the movement track, a straight line passing through the positions closest to the respective positions Pr using a well-known technique of linear interpolation computation such as the method of least squares.

The control section 22 calculates a collision lateral position Xpc on the basis of the calculated movement track. The collision lateral position Xpc is a position of the target Ob in the lateral direction (X-axis direction) obtained under the assumption that the distance in the Y-axis direction from the target Ob to the own vehicle CS is zero. In FIG. 3, since the position where the distance in the Y-axis direction from the target Ob to the own vehicle CS is zero is the X-axis on the coordinate system, the calculated collision lateral position Xpc is the intersection of the movement track and the X-axis.

The control section 22 determines a probability of a collision between the own vehicle CS and the target Ob on the basis of the calculated collision lateral position Xpc. In FIG. 3, the control section 22 sets a virtual determination region Wcd in front of the own vehicle CS, and determines that there is a probability of a collision between the own vehicle CS and the target Ob if the collision lateral position Xpc is within the determination region Wcd. Note that in a case where the collision lateral position Xpc is within the determination region Wcd, whether the probability of a collision is high or low may be determined on the basis of a ratio between the length from the center of the own vehicle CS to the collision lateral position Xpc and a region width that is the length of the determination region Wcd in the X-axis direction.

The control section 22 then calculates a time to collision (TTC) left before the own vehicle CS collides with the target Ob of a possible collision, and performs each operation of PCS in accordance with TTC. In FIG. 3, the vertical axis represents TTC, and the horizontal axis represents lateral positions. In FIG. 3, TTC increases as the distance in the vertical axis direction from the own vehicle CS to the target Ob increases, and TTC decreases as the distance in the vertical axis direction from the own vehicle CS to the target Ob decreases.

In the case of TTC1, the control section 22 controls the alarm unit 50 to notify the driver of presence of the target Ob in the forward traveling direction. In the case of TTC2, the control section 22 controls the brake unit 40 to perform automatic braking for gently decelerating the own vehicle CS to a certain degree. In the case of TTC3, the control section 22 controls the brake unit 40 for deceleration and performs preliminary operation for increasing tension of the seat belt unit 60. Note that in the case of TTC3, the control section 22 strongly decelerates the own vehicle CS to a larger degree of deceleration than that in the case of TTC2.

If the lateral positions of the target Ob are incorrectly acquired in PCS performed by the driving assist ECU 20, PCS may not be properly performed even in a situation where the actual probability of a collision between the target Ob and the own vehicle CS is high. Specifically, in a case where the camera sensor 31 calculates lateral positions on the basis of a captured image and dictionary information to determine a probability of a collision with the target Ob on the basis of the lateral positions, incorrect lateral positions may be detected due to the shape and pattern of the outer surface of the target Ob, its attachments, and the like. Suppose the target Ob is a vehicle traveling in front of the own vehicle CS. Since uneven shapes and lamp devices that vary according to the type of vehicle are provided on the rear part of the vehicle, the width between the recognized lateral positions of the target Ob may be narrower than the width between the actual lateral positions of the target Ob.

Figure 4:
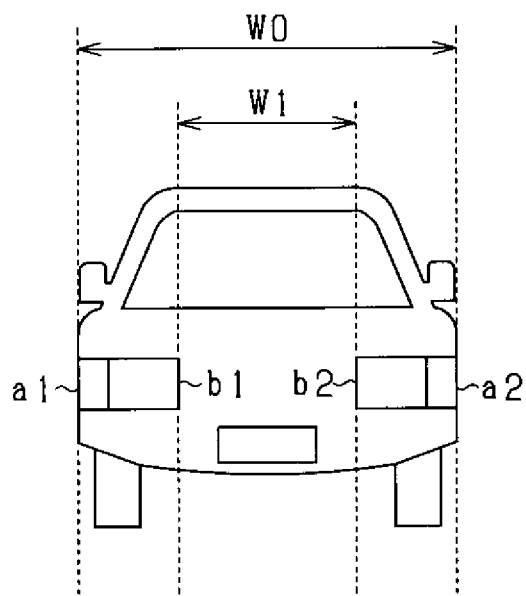
FIG. 4 is a diagram for describing incorrect acquisition of lateral positions.
Figure 4:
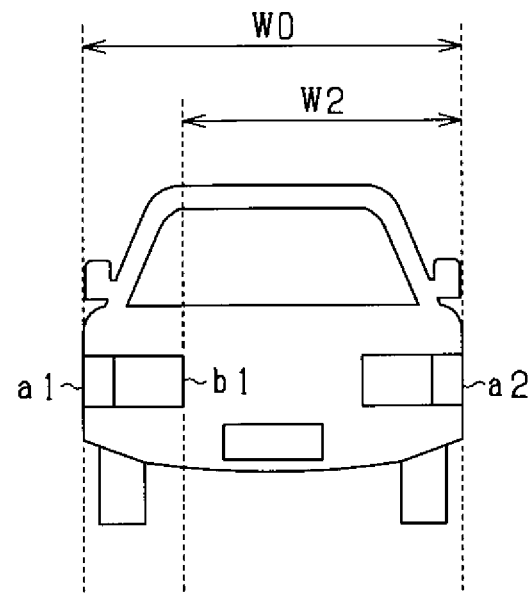

For example, suppose that the object width WO of the vehicle illustrated in each of FIGS. 4(a) and 4(b), that is, the size of the target Ob in the lateral direction (X-axis direction), is extracted from an image for acquiring lateral positions Xr and Xl. The actual object width WO of the target Ob is between end points a1 and a2 of the rear part of the vehicle. However, tail lamps and the like are provided on the rear part of the preceding vehicle, and dictionary information is possibly applied to the shape and pattern of the tail lamps and the like. Specifically, in addition to the end points a1 and a2, appearance change points b1 and b2 are present on the rear part of the vehicle due to the tail lamps, for example, and the change points b1 and b2 may be recognized as ends of the rear part of the vehicle. In this case, a lateral width W1 between the change points b1 and b2, a lateral width W2 between the change point b1 and the end point a2, or the like is calculated as the object width WO from the image, thereby causing incorrect acquisition of the lateral positions. Similarly, the object width WO of an object other than the vehicle may also be underestimated, which is not depicted in the drawing.

Therefore, if the lateral positions of the target Ob are not properly acquired, the driving assist ECU 20 changes how to perform PCS to prevent unnecessary operation of the own vehicle CS. Next, the function of the driving assist ECU 20 for changing how to perform PCS will be described.

Returning to FIG. 1, the calculation section 23 calculates a movement direction MD at each of the lateral positions. Hereinafter, the movement direction at the right end point Xr is referred to as MDr, and the movement direction at the left end point Xl is referred to as MDl. In the present embodiment, a slope of temporal changes (track) calculated on the basis of a history of each of the lateral positions Xr and Xl with reference to the vehicle traveling direction (Y-axis direction) is calculated as the movement direction MD. The track of each lateral position is calculated using, for example, a well-known technique of linear interpolation such as the method of least squares. FIGS. 5(a) and 5(b) illustrate the tracks and movement directions MD of the respective lateral positions at time points t1 to t3 and t11 to t13. Note that the use of three sampling points for calculating the movement directions MD is merely an example, and the movement directions MD may be calculated using a different number of sampling points.

The changing section 24 changes how to perform PCS on the basis of the difference between the movement directions of the respective lateral positions. As illustrated in FIG. 5(a), the movement directions MD of the right end point Xr and the left end point Xl are the same if the lateral positions of the target Ob are properly acquired. In contrast, as illustrated in FIG. 5(b), there is a difference between the movement directions MD of the respective points Xl and Xr if either the right end point Xr or the left end point Xl is not properly acquired. In FIG. 5(b), the right end point Xr (t13) is incorrectly acquired at time point t13 and closer to the left side of the drawing in the lateral direction (X direction) than its actual position is. Therefore, there is a difference between the movement directions MD of the left end point Xl and the right end point Xr.

The changing section 24 calculates ΔMD, i.e., the difference between the movement directions of the respective lateral positions, and changes how to perform PCS on the basis of the calculated difference ΔMD in the movement direction. For example, the changing section 24 changes how to perform PCS such as ease of execution and timing of execution of each operation of PCS. By changing how to perform PCS, unnecessary operation of PCS can be prevented.

Figure 6:
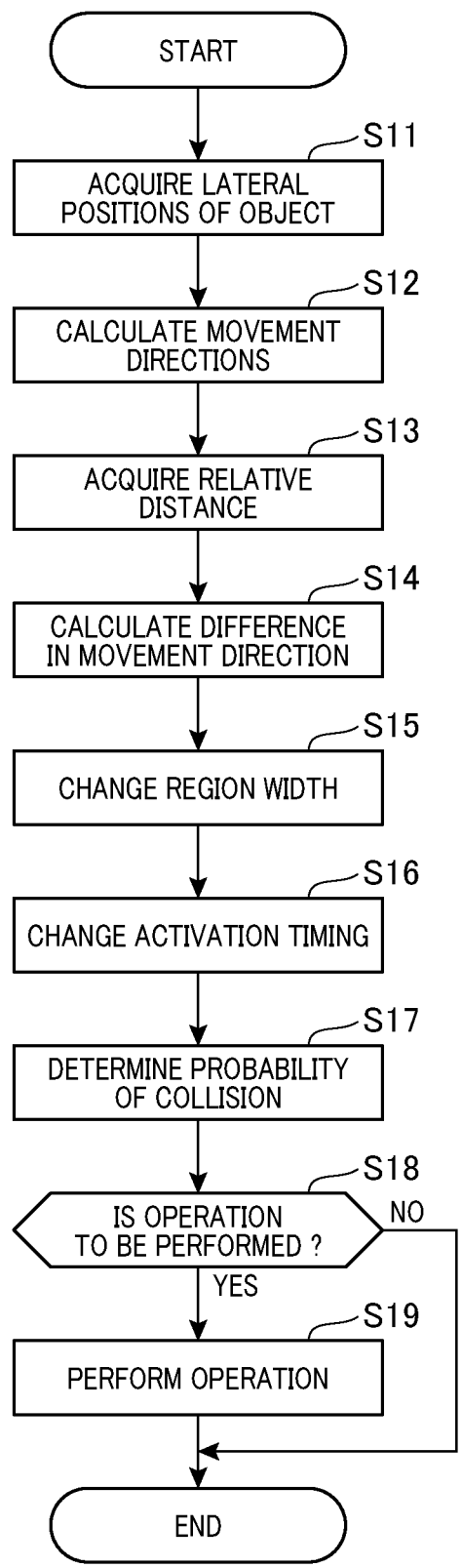
FIG. 6 is a flowchart for describing PCS performed by a driving assist ECU.

Next, PCS performed by the driving assist ECU 20 will be described with reference to the flowchart in FIG. 6. The process illustrated in FIG. 6 is performed by the driving assist ECU 20 at certain intervals.

In step S11, the lateral positions Xr and Xl of the target Ob are acquired. The lateral positions Xr and Xl acquired from the camera sensor 31 are recorded in the history information. Step S11 functions as a position acquisition step.

Figure 5:
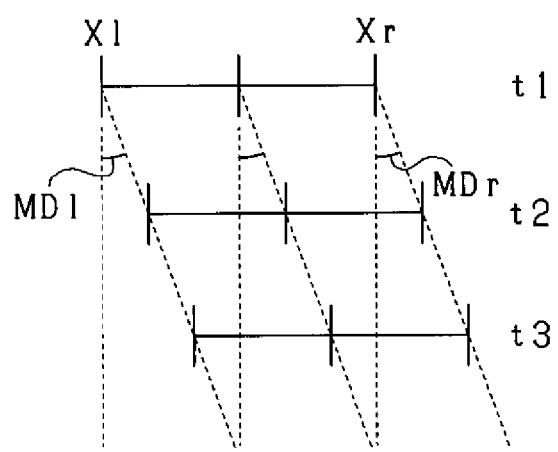
FIG. 5 is a diagram for describing movement directions MD.
Figure 5:
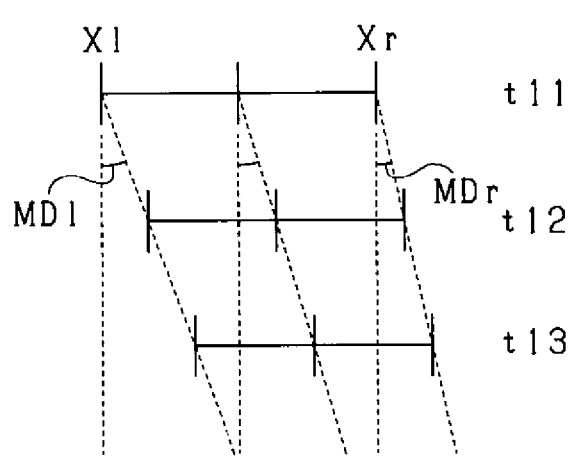

In step S12, the movement directions MD of the respective lateral positions Xr and Xl of the target Ob are calculated. For example, as illustrated in FIG. 5, tracks of the respective lateral positions Xr and Xl are calculated, and the slope of each of the calculated tracks with reference to the vehicle traveling direction (Y-axis direction) is used as the movement direction MD. Step S12 functions as a movement direction calculation step.

In step S13, a relative distance Dr to the target Ob with reference to the own vehicle CS is acquired. The Y-directional component of the position Pr of the target Ob acquired on the basis of the output from the radar sensor 37 is calculated as the relative distance Dr from the target Ob to the own vehicle CS. Therefore, step S13 functions as a distance acquisition section.

In step S14, the difference ΔMD between the movement directions at the respective lateral positions is calculated. The difference ΔMD in the movement direction is calculated using the following expression (1):

$$\Delta MD = |MDr - MDl| \quad (1)$$

where MDr is the movement direction MD calculated on the basis of the right end point Xr, and MDl is the movement direction MD calculated on the basis of the left end point Xl.

In step S15, the region width of the determination region Wcd is changed. In the present embodiment, the determination region Wcd is set by expanding or reducing a reference region width in the lateral direction (X-axis direction) using the amount of correction Av1. The amount of correction Av1 is acquired using a map illustrated in FIG. 7(a).

Figure 7:
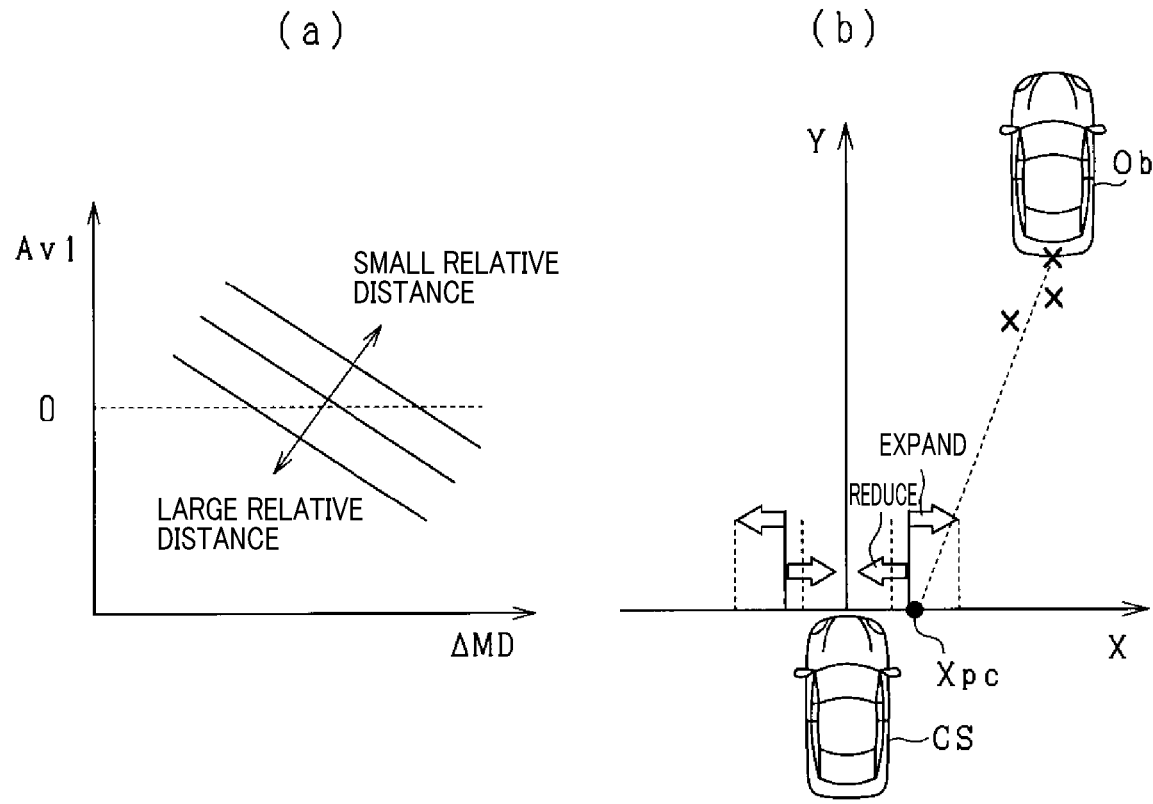
FIG. 7 is a diagram for describing setting of a region width of a determination region Wcd.

In the map illustrated in FIG. 7(a), input values (horizontal axis) represent the differences ΔMD in the movement direction, and output values (vertical axis) represent the amount of correction Av1 for the determination region Wcd. This map defines the value of the amount of correction Av1 such that the amount of correction Av1 decreases as the difference ΔMD in the movement direction increases. The amount of correction Av1 can have a positive or negative value greater or less than zero. If the amount of correction Av1 has a positive value greater than zero, the determination region Wcd is expanded in the lateral direction (X-axis direction) with respect to the reference value. If the amount of correction Av1 has a negative value less than zero, the determination region Wcd is reduced in the lateral direction (X-axis direction) with respect to the reference value.

As illustrated in FIG. 7(b), expanding the determination region Wcd increases the opportunity for the collision lateral position Xpc calculated on the basis of the movement track of the target Ob to be within the determination region Wcd, making PCS easy to activate. In contrast, reducing the determination region Wcd decreases the opportunity for the collision lateral position Xpc to be within the determination region Wcd, making PCS difficult to activate.

The driving assist ECU 20 makes PCS more difficult to activate as the relative distance Dr acquired in step S13 increases. Specifically, the map illustrated in FIG. 7(a) defines the value of the amount of correction Av1 such that the amount of correction Av1 decreases as the relative distance Dr increases at a certain difference ΔMD in the movement direction.

Returning to FIG. 6, in step S16, activation timing for PCS is changed on the basis of the difference ΔMD in the movement direction calculated in step S14. In the present embodiment, the activation timing for PCS is changed by changing TTC set in advance for each operation of PCS by using the amount of correction Av2. For example, the amount of correction Av2 is acquired using the map illustrated in FIG. 8(a).

Figure 8:
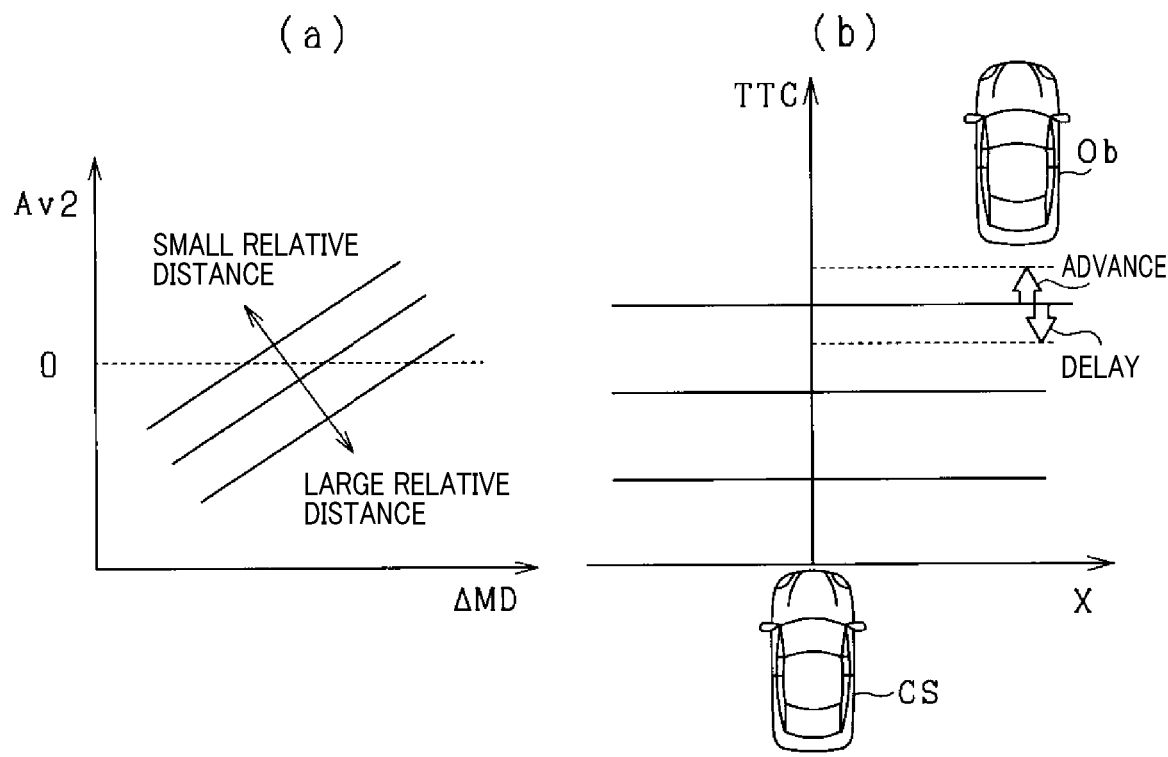
FIG. 8 is a diagram for describing setting of activation timing.

In the map illustrated in FIG. 8(a), input values (horizontal axis) represent the differences ΔMD in the movement direction, and output values (vertical axis) represent the amount of correction Av2 for TTC. This map defines the value of the amount of correction Av2 such that the amount of correction Av2 increases as the difference ΔMD in the movement direction increases. The amount of correction Av2 can have a positive or negative value greater or less than zero. If the amount of correction Av2 has a positive value greater than zero, TTC is advanced. If the amount of correction Av2 has a negative value less than zero, TTC is delayed.

As illustrated in FIG. 8(b), advancing TTC advances the time of starting each operation of PCS, making PCS easy to activate. In contrast, delaying TTC delays the time of starting each operation of PCS, making PCS difficult to activate.

The driving assist ECU 20 delays the time of activating each operation to make PCS more difficult to activate as the relative distance Dr acquired in step S13 increases. Specifically, the map illustrated in FIG. 8(a) defines the value of the amount of correction Av2 such that the amount of correction Av2 decreases as the relative distance Dr increases at a certain difference ΔMD in the movement direction. Therefore, steps S15 and S16 function as a changing step.

Returning to FIG. 6, in step S17, a probability of a collision with the target Ob is determined on the basis of the movement track of the target Ob. The collision lateral position Xpc is determined using the determination region Wcd changed in step S15, and the probability of a collision between the own vehicle CS and the target Ob is determined.

In step S18, whether to perform each operation of PCS is determined. The driving assist ECU 20 determines whether to perform PCS by using the determination result obtained in step S17 and the changed TTC.

If the operation of PCS is not to be performed (step S18: NO), the process illustrated in FIG. 6 is halted. In contrast, if the operation of PCS is to be performed (step S18: YES), in step S19, the corresponding one of the brake unit 40, the alarm unit 50, and the seat belt unit 60 is actuated on the basis of TTC, and each operation of PCS is performed. Steps S17 to S19 function as a control step.

As described above, in the first embodiment, the driving assist ECU 20 changes how to perform PCS on the basis of the difference ΔMD between the movement directions at the respective lateral positions Xr and Xr. The above configuration makes PCS difficult to perform when the difference ΔMD in the movement direction is large, and makes PCS easy to perform when the difference ΔMD in the movement direction is small. Therefore, even when an error has occurred in the lateral positions Xr and Xl acquired on the basis of an image, unnecessary operation of PCS due to the error can be prevented.

The driving assist ECU 20 calculates, as the movement direction MD, a slope of temporal changes of each lateral position with reference to the vehicle traveling direction (Y-axis), and calculates the difference between the slopes of the respective specific points as the difference ΔMD in the movement direction. With the above configuration, the difference ΔMD in the movement direction can be calculated using the difference in slope, that is, the difference ΔMD in the movement direction can be calculated with a simple technique.

The driving assist ECU 20 calculates, as the collision lateral position Xpc, on the basis of the movement track of the target Ob, the position of the target Ob in the lateral direction under the assumption that the distance from the target Ob to the own vehicle CS is zero, and performs PCS if the calculated collision lateral position Xpc is within the determination region Wcd set in front of the own vehicle CS. The driving assist ECU 20 then changes the region width of the determination region Wcd in the lateral direction on the basis of the difference ΔMD in the movement direction to change how to perform PCS. With the above configuration, how to perform PCS can be changed by changing the lateral region width of the determination region Wcd, and changing how to perform PCS can thus be realized with a simple technique.

The driving assist ECU 20 acquires the relative distance Dr from the own vehicle CS to the target Ob for changing how to perform PCS, and makes the operation of PCS more difficult to perform as the relative distance Dr increases. Imaging accuracy of the camera sensor 31 decreases as the distance from the own vehicle CS to the target Ob increases, causing a large error in the lateral positions of the target and a large difference between the movement directions of the respective lateral positions. Thus, PCS is made difficult to activate by making the determination region Wcd more difficult to expand in the lateral direction as the distance from the own vehicle CS to the target Ob increases. With the above configuration, unnecessary operation in PCS can be properly prevented in accordance with the relative distance Dr from the own vehicle CS to the target Ob.

Second Embodiment

In the second embodiment, the driving assist ECU 20 changes how to perform PCS on the basis of the difference ΔMD in the movement direction and the relative speed Vr of the target Ob with reference to the own vehicle CS. As used herein, the relative speed Vr with reference to the own vehicle CS means a value obtained by subtracting the own vehicle speed Vs from the relative speed Vr of the target Ob. In the present embodiment, the direction in which the target Ob moves close to the own vehicle CS is a positive direction, and the direction in which the target Ob moves away from the own vehicle CS is a negative direction.

Figure 9:
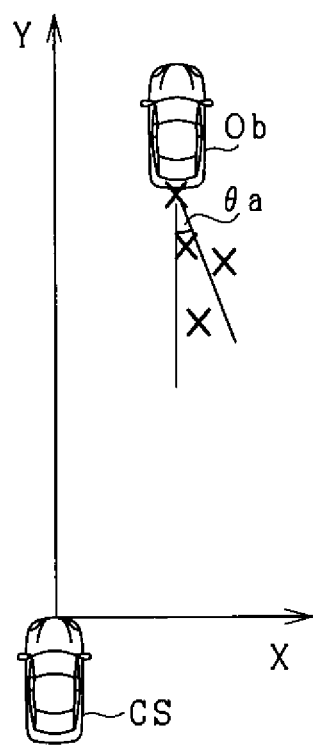
FIG. 9 is a diagram illustrating changes of lateral positions of targets Ob having different relative speeds Vr.
Figure 9:
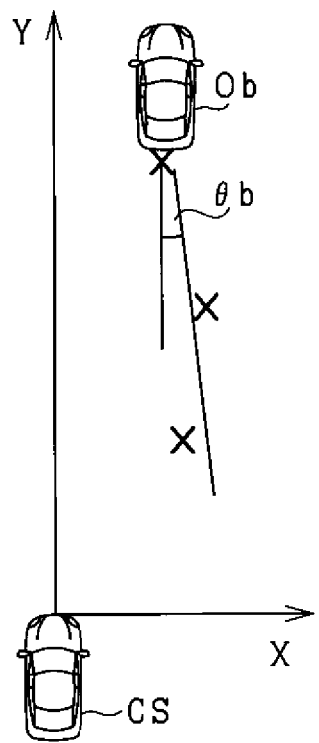
Figure 9:
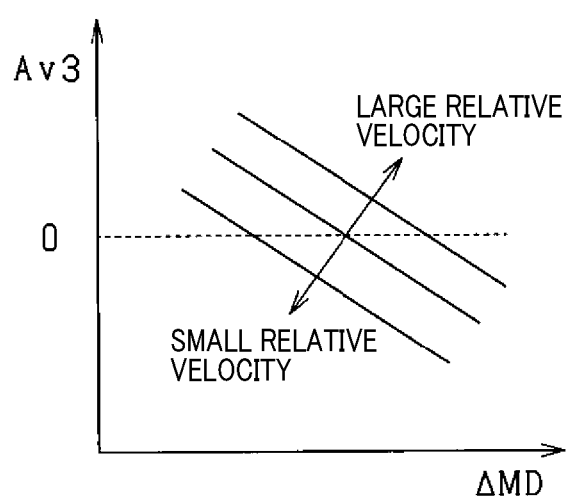
Figure 9:
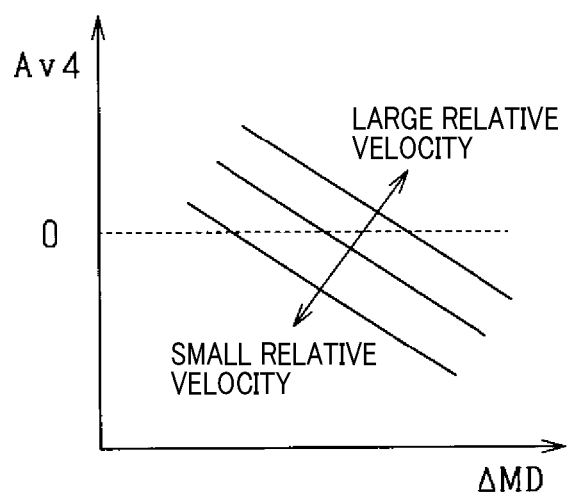

FIGS. 9(a) and 9(b) illustrate changes of lateral positions of targets Ob having different relative speeds Vr. The target Ob illustrated in FIG. 9(a) has a smaller relative speed Vr than that of the target Ob illustrated in FIG. 9(b).

The movement direction MD of a lateral position can also be expressed by a ratio between the relative speed Vy of the target Ob in the vehicle traveling direction (Y-axis direction) and the relative speed Vx of the target Ob in the lateral direction (X-axis direction). The ratio of the relative speed Vy in the vehicle traveling direction (Y-axis direction) to the relative speed Vx in the lateral direction (X-axis direction) increases as the relative speed Vr of the target Ob decreases. Therefore, providing that there is a lateral error in the acquired lateral position, the influence of the error increases as the relative speed Vr decreases. In the example in FIG. 9, the target Ob in FIG. 9(a) has a smaller relative speed Vr than the target Ob illustrated in FIG. 9(b), and the slope θa of the movement track of the position Pr is larger than the slope θb, indicating that the influence of the lateral error in the lateral position is larger in FIG. 9(a) than in FIG. 9(b).

Therefore, in the second embodiment, the driving assist ECU 20 makes the operation of PCS more difficult to activate as the relative speed Vr decreases, and makes the operation of PCS easier to activate as the relative speed Vr increases. For example, in step S15 of FIG. 6, the region width of the determination region Wcd is changed on the basis of the difference ΔMD in the movement direction and the relative speed Vr of the target Ob. In step S16, TTC is changed on the basis of the difference ΔMD in the movement direction and the relative speed Vr of the target Ob.

The map illustrated in FIG. 9(c) defines the value of the amount of correction Av3 for setting the determination region Wcd such that the amount of correction Av3 decreases as the relative speed Vr decreases. The collision determination in step S17 is performed using the determination region Wcd set by using this map. Thus, the determination region Wcd decreases as the relative speed Vr decreases, making the operation of PCS difficult to activate. In addition, the determination region increases as the relative speed Vr increases, making the operation of PCS easy to activate.

The map illustrated in FIG. 9(d) defines the value of the amount of correction Av4 for setting the activation timing for the operation of PCS such that the amount of correction Av4 decreases as the relative speed Vr decreases. The activation timing (TTC) is set by using this map. Thus, TTC for performing PCS is delayed as the relative speed Vr decreases. In addition, TTC for performing PCS is advanced as the relative speed Vr increases.

Note that the driving assist ECU 20 acquires the relative speed Vr of the target Ob on the basis of the output from the radar sensor 37. Alternatively, the relative speed Vr of the target Ob may be calculated by dividing the relative distance Dr acquired in step S13 of FIG. 6 by a certain time. The certain time may be, for example, the time from transmission of transmission waves from the radar sensor 37 to reception of reflected waves corresponding to the transmission waves. Therefore, in the second embodiment, the driving assist ECU 20 functions as a relative speed acquisition section.

As described above, in the second embodiment, the driving assist ECU 20 acquires the relative speed Vr of the target Ob with reference to the own vehicle CS for changing how to perform PCS, and makes the operation of PCS more difficult to activate as the relative speed Vr decreases. With the above configuration, unnecessary operation in PCS can be properly prevented in accordance with the relative speed Vr of the target Ob with reference to the own vehicle CS.

Third Embodiment

In the third embodiment, in a case where the driving assist ECU 20 changes how to perform PCS, the driving assist ECU 20 makes the operation easy or difficult to activate using different degrees of change.

Figure 10:
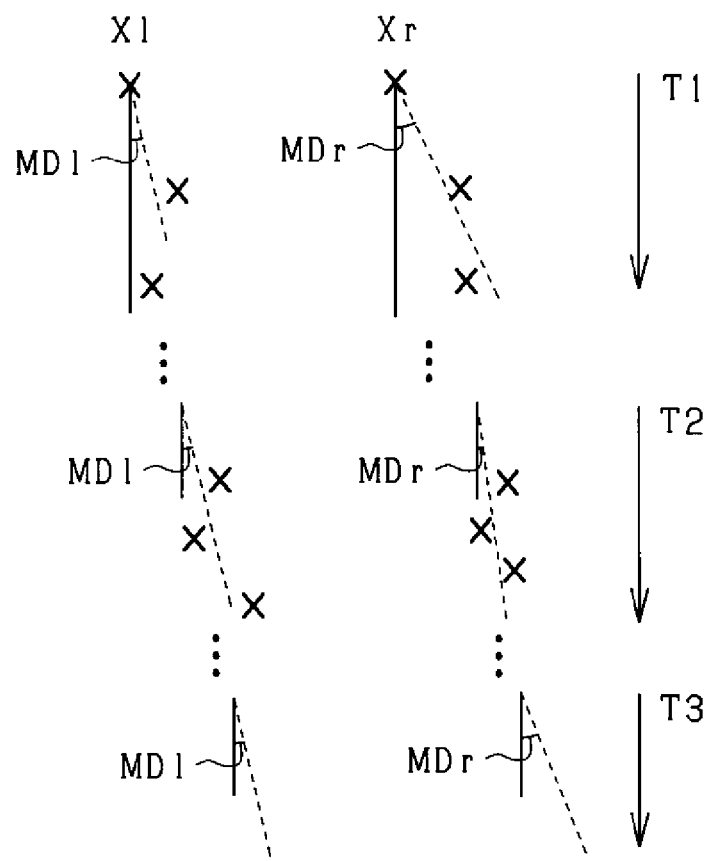
FIG. 10 is a diagram for describing changes of the movement directions MD of lateral positions.
Figure 10:
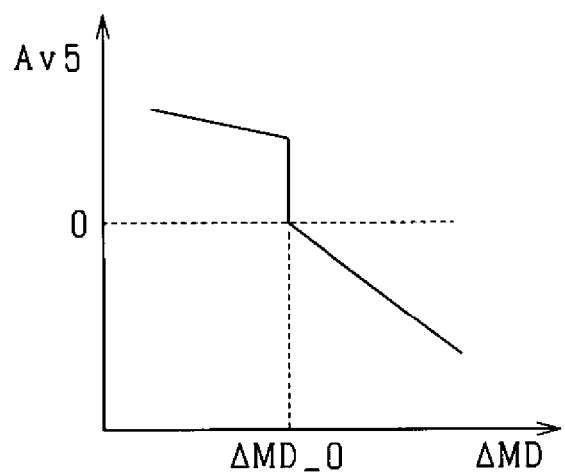

FIG. 10(*a*) illustrates an example of temporal changes of the difference ΔMD in the movement direction during periods T1 to T3. In FIG. 10(*a*), the difference ΔMD (|MDr−MDl|) in the movement direction temporarily becomes small during period T2 compared with those during periods T1 and T3. In this case, the reduction of the difference ΔMD in the movement direction during period T2 is accidental. Therefore, even though the determination region Wcd is reduced for making the operation of PCS easy to activate, the difference ΔMD in the movement direction increases again during period T3, and the determination region Wcd has to be expanded. In addition, expanding the determination region Wcd is not preferable because it is liable to facilitate unnecessary operation of PCS.

Therefore, the driving assist ECU 20 makes the determination region Wcd more difficult to expand in the lateral direction than to reduce. With reference to the difference ΔMD_0 in the movement direction corresponding to an amount of correction Av5 of zero, the map illustrated in FIG. 10(*b*) defines the value of the amount of correction Av5 such that the slope of the amount of correction Av5 based on the difference ΔMD in the movement direction less than the difference ΔMD_0 is smaller than the slope of the amount of correction Av5 based on the difference ΔMD in the movement direction greater than the difference ΔMD_0. Note that the amount of correction Av5 is for setting the determination region Wcd. The driving assist ECU 20 performs step S15 by using the map illustrated in FIG. 10(*b*) to make the determination region Wcd more difficult to expand in the lateral direction than to reduce.

As described above, in the third embodiment, the driving assist ECU 20 makes the determination region Wcd more difficult to expand in the lateral direction than to reduce. With the above configuration, occurrence of unnecessary operation of PCS due to an accidental change of the difference ΔMD in the movement direction can be prevented.

Other Embodiments

The driving assist ECU 20 may calculate the movement directions MD at three points: the lateral positions and the middle point between the lateral positions, as specific points of an object, and calculate the difference ΔMD between the movement directions. With the above configuration, the difference ΔMD in the movement direction can be acquired more accurately by using the three points.

The amount of correction Av may have a non-linear relation with the difference ΔMD in the movement direction instead of a linear relation. The driving assist ECU 20 may calculate the amount of correction Av from the difference ΔMD in the movement direction by a computation process instead of by using a map that defines the relation between the difference ΔMD in the movement direction and the amount of correction Av.

Instead of calculating the movement direction MD by performing linear interpolation on lateral positions recorded in the history information, the movement direction MD may be calculated by performing curve interpolation on lateral positions.

In a case where the camera sensor 31 detects the type of target, the ease of execution of PCS based on the difference ΔMD in the movement direction may be changed for targets having a large lateral width. For example, in a case where the driving assist ECU 20 distinguishes between pedestrians, two-wheel vehicles, and automobiles as types of targets, if a target is a two-wheel vehicle or automobile, the ease of execution of PCS may be changed on the basis of the difference ΔMD in the movement direction. With regard to two-wheel vehicles, the driving assist ECU 20 may distinguish between bicycles and motorcycles.

The PCSS 100 may include the driving assist ECU 20 and the camera sensor 31 as an integrated unit, instead of including the driving assist ECU 20 and the camera sensor 31 individually. In this case, the above-mentioned driving assist ECU 20 is provided inside the camera sensor 31.

The present disclosure has been described with reference to the examples, but it is to be understood that the present disclosure is not limited to the examples and structures described above. The present disclosure covers various modifications and equivalent variations. In addition to various combinations and forms, other combinations and forms including one, or more or fewer elements thereof are also within the spirit and scope of the present disclosure.

The invention claimed is:

1. A vehicle control apparatus that detects an object present ahead of a vehicle based on an image acquired by an imaging section, the vehicle control apparatus comprising:
a computer including memory having instructions stored thereon that cause the computer to perform operations, the operations comprising:
acquiring, based on the image, positions of at least two specific points of the object that are different in a lateral direction with respect to a vehicle traveling direction;
performing collision avoidance control for avoiding a collision with the object based on a movement track of the object obtained from a history of the positions of the specific points, wherein the collision avoidance control includes automatic braking;
calculating, for each of the specific points, a movement direction of each of the specific points based on the history of the position of each of the specific points; and
changing how the collision avoidance control is performed based on a difference between the movement directions at the respective specific points, wherein:
the changing how the collision avoidance control is performed includes making the collision avoidance control more difficult to activate as the difference between the movement directions at the respective specific points increases.

2. The vehicle control apparatus according to claim 1, wherein the operations further comprise:
calculating, as the movement direction, a slope of temporal changes of each of the specific points with reference to the vehicle traveling direction, and
calculating, as the difference in the movement direction, a difference between the slopes of the temporal changes.

3. The vehicle control apparatus according to claim 1, wherein the operations further comprise:
calculating, as a collision lateral position, based on the movement track of the object, a position of the object in the lateral direction under an assumption that a distance from the object to the vehicle is zero, and performs the collision avoidance control if the calculated collision lateral position is within a determination region set in front of the vehicle, and wherein:

the changing how the collision avoidance control is performed includes changing a region width of the determination region in the lateral direction based on the difference in the movement direction.

4. The vehicle control apparatus according to claim 1, wherein the operations further comprise:

acquiring a distance from the vehicle to the object, wherein:

when changing how the collision avoidance control is performed, the collision avoidance control is made more difficult to perform as the distance increases.

5. The vehicle control apparatus according to claim 1, wherein the operations further comprise:

acquiring a relative speed of the object with reference to the vehicle, wherein:

when changing how the collision avoidance control is performed, the collision avoidance control is made more difficult to perform as the relative speed decreases.

6. The vehicle control apparatus according claim 2, wherein the operations further comprise:

making the determination region more difficult to expand in the lateral direction than to reduce.

7. The vehicle control apparatus according to claim 1, wherein:

the changing how the collision avoidance control is performed includes changing an activation time for operation in the collision avoidance control based on the difference in the movement direction.

8. A vehicle control method of detecting an object present ahead of a vehicle based on an image captured by an imaging section, the vehicle control method comprising:

a position acquisition step of acquiring, based on the image, positions of at least two specific points of the object that are different in a lateral direction with respect to a vehicle traveling direction;

a control step of performing collision avoidance control for avoiding a collision with the object based on a movement track of the object obtained from a history of the positions of the specific points, wherein the collision avoidance control includes automatic braking;

a calculation step of calculating, for each of the specific points, a movement direction of each of the specific points based on the history of the position of each of the specific points; and a changing step of changing how the collision avoidance control is performed in the control step based on a difference between the movement directions at the respective specific points, wherein in the changing step, how the collision avoidance control is performed is changed by making the collision avoidance control more difficult to activate as the difference between the movement directions at the respective specific points increases.

9. A vehicle control apparatus that detects an object present ahead of a vehicle based on an image, the vehicle control apparatus comprising:

a computer including memory having instructions stored thereon that cause the computer to perform operations, the operations comprising:

acquiring, based on the image, positions of at least two specific points of the object that are different in a lateral direction with respect to a vehicle traveling direction;

performing collision avoidance control for avoiding a collision with the object based on a movement track of the object obtained from a history of the positions of the specific points, wherein the collision avoidance control includes automatic braking;

calculating, for each of the specific points, a movement direction of each of the specific points based on the history of the position of each of the specific points;

changing how the collision avoidance control is performed based on a difference between the movement directions at the respective specific points;

calculating, as a collision lateral position, based on the movement track of the object, a position of the object in the lateral direction under an assumption that a distance from the object to the vehicle is zero, and performs the collision avoidance control if the calculated collision lateral position is within a determination region set in front of the vehicle;

changing how the collision avoidance control is performed by changing a region width of the determination region in the lateral direction based on the difference in the movement direction; and making the determination region more difficult to expand in the lateral direction than to reduce.

10. A vehicle control apparatus that detects an object present ahead of a vehicle based on an image, the vehicle control apparatus comprising:

a computer including memory having instructions stored thereon that cause the computer to perform operations, the operations comprising:

acquiring, based on the image, positions of at least two specific points of the object that are different in a lateral direction with respect to a vehicle traveling direction;

performing collision avoidance control for avoiding a collision with the object based on a movement track of the object obtained from a history of the positions of the specific points, wherein the collision avoidance control includes automatic braking;

calculating, for each of the specific points, a movement direction of each of the specific points based on the history of the position of each of the specific points; and changing how the collision avoidance control is performed based on a difference between the movement directions at the respective specific points, wherein:

how the collision avoidance control is performed includes changing an activation time for operation in the collision avoidance control based the difference in the movement direction.

* * * * *